United States Patent

[11] 3,562,568

| [72] | Inventors | Robert A. Susdorf;<br>Fredrick J. Armstrong, Fort Wayne, Ind. |
|---|---|---|
| [21] | Appl. No | 831,466 |
| [22] | Filed | June 9, 1969 |
| [45] | Patented | Feb. 9, 1971 |
| [73] | Assignee | General Electric Company<br>a corporation of New York |

[54] HIGH PERFORMANCE DYNAMOELECTRIC MACHINE WITH PERMANENT MAGNET STATOR
18 Claims, 7 Drawing Figs.

[52] U.S. Cl. .................................................... 310/154,
310/225, 310/216, 310/182
[51] Int. Cl. ........................................................ H02h 21/26
[50] Field of Search ........................................... 310/220–
—225, 218, 192, 182, 183, 154, 155, 269, 194,
180, 265, 261, 262, 211; 335/; 29/596

[56] References Cited
UNITED STATES PATENTS

| 1,082,532 | 12/1913 | Lamme | 310/183 |
|---|---|---|---|
| 1,894,273 | 1/1933 | Hunziker | 310/262 |
| 2,193,406 | 3/1940 | Goss et al. | 310/154 |
| 2,903,610 | 9/1959 | Bessiere | 310/220X |
| 3,409,788 | 11/1968 | Taylor | 310/225X |
| 3,465,184 | 9/1969 | Armstrong et al. | 310/66 |
| 3,465,186 | 9/1969 | Susdorf et al. | 310/158 |
| 2,419,863 | 4/1949 | Ware | 310/211 |

Primary Examiner—D. F. Duggan
Attorneys—John M. Stoudt, Radford M. Reams, Frank L. Neuhauser, Oscar B. Waddell, Ralph E. Krisher, Jr. and Joseph B. Forman ABSTRACT: High-performance dynamoelectric machine capable of rapid response to fast changing operational requirements and conditions incorporates stator having magnetic poles and shell. Each pole comprises two axially extending separated pole pieces connected to shell by two or more axially extending permanent magnets. Pole pieces are separated transversely by a space in which a conductor is disposed. Conductors are connected to form a short-circuited winding. Low inertia rotor includes a magnetic core having stub shafts secured to ends thereof and a commutator on one stub shaft. Conductors in circuit with commutator extend axial length of rotor core and are embedded in insulating material compatible with other insulation used, to maintain the conductors in place but permit effective dissipation of heat from the rotor assembly. Baffles may be used to force cooling fluid over and around the movable member to provide increased heat dissipation.

PATENTED FEB 9 1971

INVENTORS:
ROBERT A. SUSDORF,
FREDRICK J. ARMSTRONG,

BY John M. Stoudt

ATTORNEY

INVENTORS
ROBERT A. SUSDORF,
FREDRICK J. ARMSTRONG,
BY John M. Stoudt
ATTORNEY.

TYPICAL SPEED-TORQUE CURVES

INVENTORS:
ROBERT A. SUSDORF,
FREDRICK J. ARMSTRONG

BY John M. Stoudt

ATTORNEY.

3,562,568

HIGH PERFORMANCE DYNAMOELECTRIC MACHINE WITH PERMANENT MAGNET STATOR

BACKGROUND OF THE INVENTION

1. Field of the Invention

The present invention relates to high-performance, fast-response dynamoelectric machines, and in particular to such machines incorporating a low inertia rotor.

2. Description of the Prior Art

There has been an increasing demand in recent years for high-performance, fast-response dynamoelectric machines in the form of direct current electric motors capable of rapid response to fast changing operational requirements and conditions on the order of milliseconds. Single-capstan tape transports, disc packs, high-speed printers, card sorters and other computer peripheral equipment are representative of applications where exacting, fast and repeated acceleration rates, as well as high current switching, are important, if not critical. Generally speaking, it is desirable that motors for these types of applications have a low inertia rotor to produce as low inertial and inductive time constants as possible in order to during acceleration and that the current be as high as possible without rapid reaction to the changing conditions. An inertial time constant refers to the time it takes a motor to achieve rated running speed and an inductive time constant is normally considered to be approximately the time it takes for armature current in a motor having a locked rotor to each 62 percent of its rated value. To achieve this rapid response to changing conditions, it is desirable that current buildup, and hence torque, be as rapid as possible without causing damage to the components. It is also desirable for best operating results, that the rates, possible during acceleration and that the current be as high as possible without acceleration characteristics, affected by the inertia of the rotor among other factors, be as linear as possible. The motor should be able economically to produce these performance characteristics for long periods of operation.

In designing a rapid response motor, a stator should be provided which has a high magnetic field strength. Further, the rotor should have a low armature circuit inductance and resistance, a large magnetic mass for the core of the rotor and as small a shaft as possible within the core for optimum results. One measure of this latter feature is an axial core length to shaft diameter (within the core) ratio. In the prior art, ratios above 17 to 1 have been particularly difficult to obtain, especially where the assembly is required to accelerate rapidly to running speeds far in excess of 2,500 r.p.m. Under such conditions, shafts of small cross section have a tendency to bend and the movable member is subjected to high operating stresses. In addition, the ability to effectively dissipate heat from the rotor, especially when the motor operates at high temperature levels (internal motor ambients of 100° C.) has been a constant problem in prior art motors.

SUMMARY OF THE INVENTION

Accordingly, it is an object of the present invention to provide an improved dynamoelectric machine incorporating a stator having a high magnetic field strength.

It is another object of the present invention to provide an improved dynamoelectric machine incorporating a low inertia rotor.

It is a further object of the present invention to provide an improved dynamoelectric machine having unusually low inertial and inductive time constants.

In carrying out the invention in one form, these and other objects are accomplished by a dynamoelectric machine comprising a stator including a shell and at least two magnetic poles. Each pole comprises two or more permanent magnets fixed to the shell and a pole piece fixed to each of the permanent magnets. The magnets and pole pieces extend axially of the shell and are separated transversely by a space in which a conductor is disposed. A rotor including a low inertia-type armature assembly is mounted for relative rotation with respect to the stator. The low inertia armature assembly or rotor comprises a magnetic core having shaft means secured to opposite ends thereof.

BRIEF DESCRIPTION OF THE DRAWINGS

The subject matter which is regarded as the invention is particularly pointed out and distinctly claimed in the concluding portion of the specification. The invention, itself, however, both as to its organization and method of operation, together with further objects and advantages thereof, may best be understood by reference to the following description taken in connection with the accompanying drawings, in which:

DESCRIPTION OF THE PREFERRED EMBODIMENTS

Figure 1:
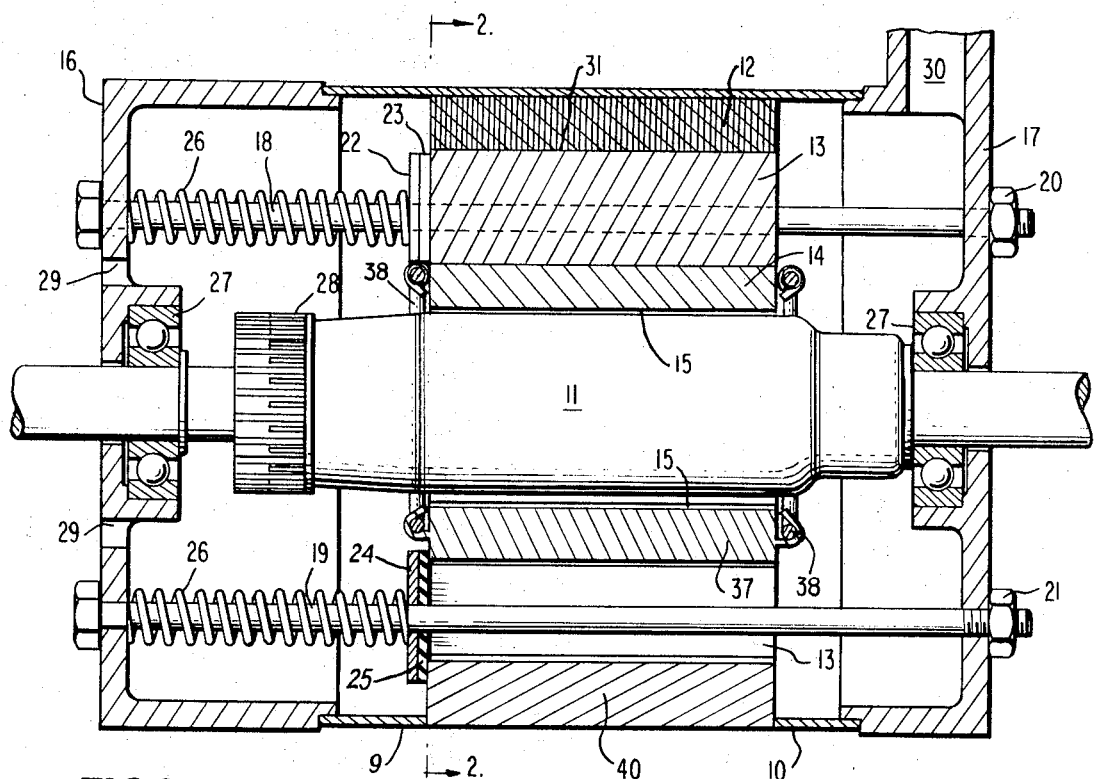
FIG. 1 is a side elevational view, partly in cross section and partly broken away, of a direct current dynamoelectric machine incorporating one form of the present invention.

Turning now to the drawings in more detail, FIG. 1 illustrates one form of the present invention incorporated in an improved high-performance, direct-current-type, two-pole dynamoelectric machine suitable for use in such demanding fast-response applications as single-capstan tape transports, disc packs, high-speed printers, card sorters and other computer peripheral equipment. In the illustrated form, the dynamoelectric machine comprises a stator 10 and a rotor 11. Stator 10 comprises an axially extending outer yoke having a metal housing shell 9 and an annulus of magnetic material, e.g. magnetic laminations 12, to which four axially extending permanent magnets 13 are adhesively secured. Axially extending pole pieces 14 are adhesively secured to magnets 13 and extend inwardly thereof. The pole pieces 14 have inner arcuate surfaces 15 which define a bore in which the rotor 11 is disposed.

End members 16 and 17 are secured to opposite ends of shell 9 by suitable means such as screws 18 and 19 with their associated nuts 20 and 21. In the embodiment shown in FIG. 1 the screws 18 and 19 pass through the interior of the motor between the magnets 13 of a pole inasmuch as the shell 9 is too thin to receive a threaded screw. In larger motors constructed in accordance with the principles of this invention, the shell is much thicker and the end members can be secured to the shell by screws extending into the shell itself. Screw 18 also extends through a nonmagnetic baffle 22 (aluminum for example) and rubber gasket 23 at one end of the magnets 13. The baffle 22 and rubber gasket 23 serve to block an air passage between magnets 13 of a pole and are more fully discussed hereinafter. In a similar manner, screw 19 extends through a nonmagnetic baffle 24 and rubber gasket 25. Springs 26 respectively surround screws 18 and 19 to hold the baffles 22 and 24 in place. In larger motors where end members are secured to a shell by screws which thread into the shell, baffles 22 and 24 might be adhesively secured. But in a machine as illustrated in FIG. 1, the screws 18 and 19 pass through and affect the magnetic structure of the machine. The screws 18 and 19 therefore have to be peripherally adjustable in order to adjust the magnetic neutral of the machine.

End members 16 and 17 have bearing assemblies 27 for mounting rotor 11 for relative rotation with respect to the stator 10. Rotor 11 includes a commutator 28 which is adapted to be contacted by brushes (not shown), one brush position for each pole of the machine, in a manner well known in the art. End member 16 has apertures 29 through which cooling fluid for the machine is admitted, and end member 17 has an exhaust 30 through which cooling fluid exits. A fan or pump may be connected to the exhaust 30 to insure a continuous flow of cooling fluid through the machine.

Figure 2:
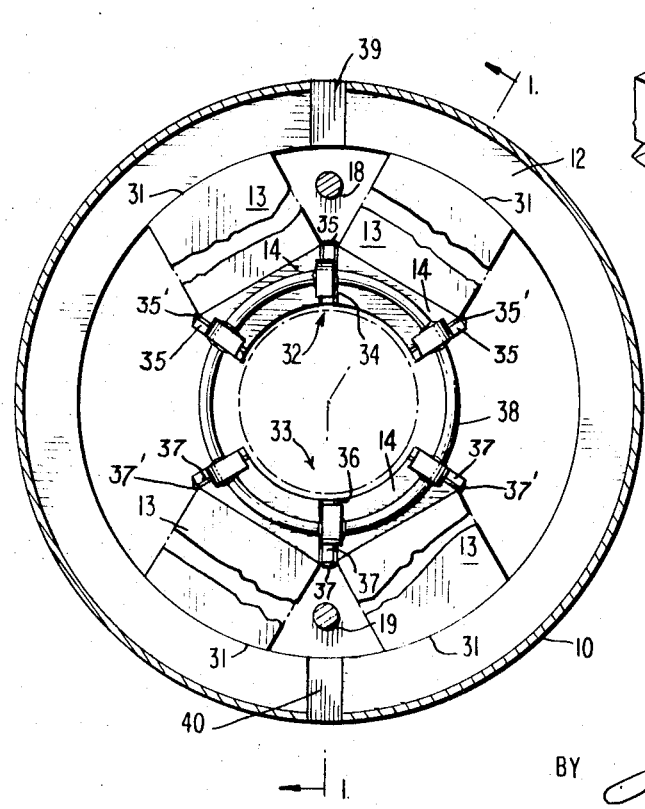
FIG. 2 is an end view of the machine of FIG. 1 with the baffles, end members and rotor removed.
Figure 2A:
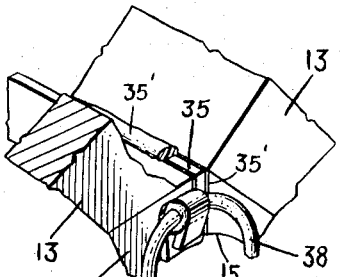
FIG. 2a is a view in perspective, with parts broken away, showing portions of magnets, pole pieces, conductors, and a conductor ring in the machine of FIG. 1.

The details of stator 10 more clearly appear in FIG. 2 which is an end view of the machine of FIG. 1 with the end members, baffles and rotor removed. In FIG. 2 it can be seen that magnets 13 have arcuate surfaces 31 which are adhesively secured to the shell 9. Two magnetic poles, generally indicated by reference numerals 32 and 33, are illustrated as including pole pieces 14 adhesively secured to magnets 13 and extending inwardly thereof in polar regions defined by the magnets. A dynamoelectric machine constructed in accordance with the principles of this invention may have more than two poles, but must have a minimum of two poles. It is to be noted that the two pole pieces 14 which cooperate to form magnetic pole 32 are separated by a transverse space 34 in which a conductor 35 is disposed. In a like manner, the pole pieces 14 which cooperate to form magnetic pole 33 are separated by a transverse space 36 in which a conductor 37 is disposed. Such separation of the pole pieces which form a magnetic pole serves to impede the transverse passage of magnetic flux through the pole pieces of the same pole, which reduces the inductive time constant of the machine, allowing more rapid acceleration.

Placing the conductors 35 and 37 in spaces 34 and 36, respectively, produces several beneficial results. First, assembly is facilitated since the conductors 35 and 37 act as physical spacers to keep the pole pieces 14 apart during assembly and also remain in place after assembly. Second, conductors 35 and 37 are connected at either end thereof by conductor rings 38 which are suitably attached (as by soldering) to the conductors 35 and 37. The conductors 35 and 37 may be secured in place by means of an adhesive material as shown for example at 35' and 37'. The conductors 35 and 37 and conductor rings 38 form a single short-circuited squirrel-cage winding. In operation, this winding induces currents in opposition to field changes resulting from changes in armature current without increasing armature resistance. It thus tends to minimize armature inductance to that approaching self inductance in air, and improves linear accelerating and commutation characteristics for the machine. Finally, the conductors 35 and 37 act as additional magnetic shields to increase the reluctance to transverse flux between the pole pieces of a pole.

In FIG. 2, shell 9 has two nonmagnetic inserts 39 and 40 which are positioned in the center of magnetic poles 32 and 33, respectively. These nonmagnetic inserts increase the reluctance to magnetizing flux which tends to flow between the magnets of a pole through the shell 9 which serves to further reduce the inductive time constant of the machine. Thus, means for increasing the reluctance to magnetic flux tending to flow between adjacent permanent magnets in each polar region comprises at least one conductor within a polar region and at least one nonmagnetic insert.

Figure 3:
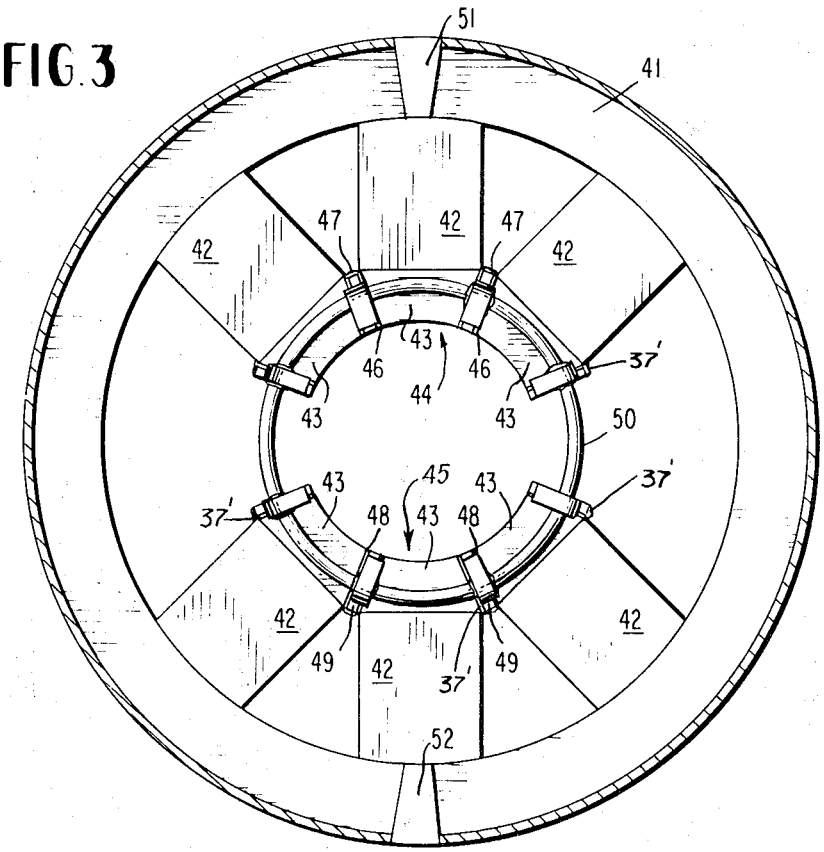
FIG. 3 is an illustration similar to FIG. 2 showing a machine which has three permanent magnets per pole.

FIG. 3 illustrates a stator for a machine in which there are provided three permanent magnets per pole. In FIG. 3, a shell 41 has adhesively attached thereto six permanent magnets 42 to which, in turn, pole pieces 43 are adhesively attached to form two magnetic poles generally indicated by reference numerals 44 and 45. The pole pieces 43 which form magnetic pole 44 are separated from each other by spaces 46 in which conductors 47 are disposed. In a like manner, the pole pieces 43 which form magnetic pole 45 are separated from each other by spaces 48 in which conductors 49 are disposed. As is the case for a machine having two magnets per pole, the spaces 46 and 48 serve to impede the transverse passage of flux between the pole pieces of a pole, thereby reducing the inductive time constant of the machine. The conductors 47 and 49 serve as physical spacers to keep the pole pieces apart during assembly and also act as additional shields to increase the reluctance to transverse flux between the pole pieces of a pole. Conductor rings 50 (one at each end of shell 41) are suitably attached (as by soldering) to the conductors 47 and 49 to provide a good electrical connection and form a short-circuited squirrel-cage winding. In operation, this winding induces currents in opposition to field changes resulting from changes in armature current without increasing armature resistance. It thus tends to minimize armature inductance to that approaching self inductance in air, and improves linear accelerating and commutation characteristics of the machine. As in the case of a two magnet per pole machine, the yoke of FIG. 3 has nonmagnetic inserts 51 and 52 which are aligned with poles 44 and 45 and serve to impede transverse passage of flux which tends to flow between the magnets of a pole through the yoke. To maximize yoke permeance and still retain the desired high degree of reluctance in the yoke circuit, the inserts may be formed with a generally wedge-shaped cross-sectional area as illustrated. In addition, for those situations where the shell is employed as a part of the yoke circuit, a maximum advantage with use of the inserts may be accomplished by extending the inserts entirely through the shell in the illustrated manner.

Figure 4:
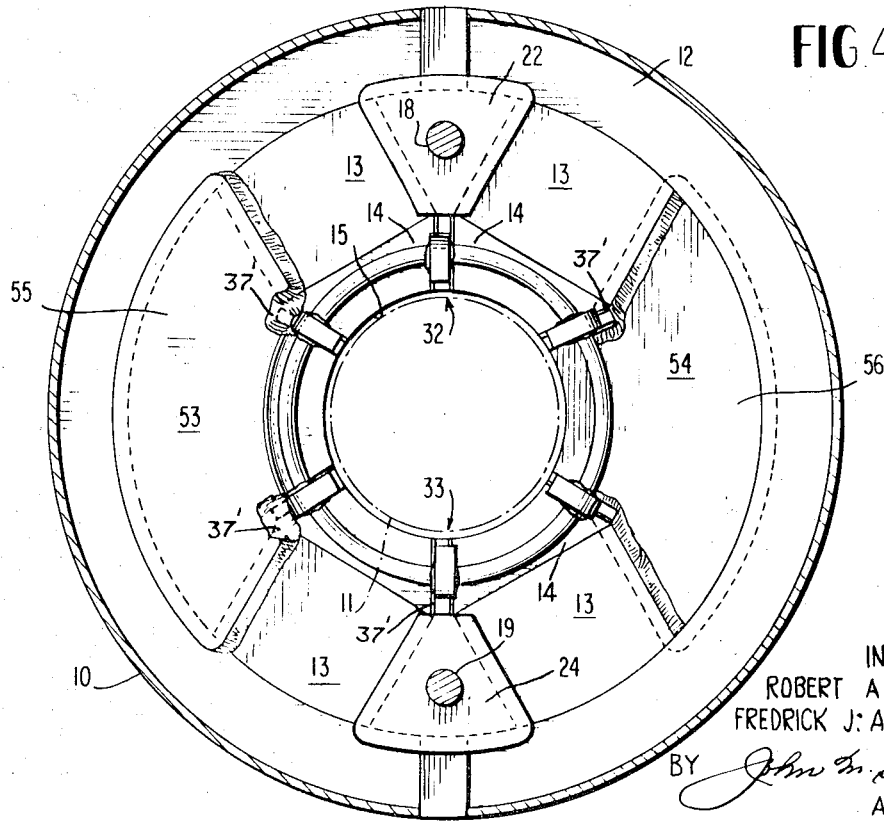
FIG. 4 is an illustration of the machine of FIG. 2 with the baffles and rotor in place.

FIG. 4 is an illustration of the stator of FIG. 2 showing the baffles installed thereon. In FIG. 4, the space between magnets 13 of pole 32 is covered with a baffle 22 made of any suitable nonmagnetic material such as aluminum and the space between magnets 13 of pole 33 is covered by a baffle 24, also made of nonmagnetic material. As discussed in connection with FIG. 1, baffles 22 and 24 are held in place by springs which for clarity are not shown in FIG. 4. Arcuate surfaces 15 of pole pieces 14 define a bore within which the rotor 11 is disposed. Two passages 53 and 54 are formed between magnetic poles 32 and 33 which communicate with the bore. A nonmagnetic baffle 55 is adhesively secured to one end of stator 10 to obstruct passage 53 and a nonmagnetic baffle 56 is adhesively secured to the opposite end of stator 10 to obstruct passage 54. Cooling fluid enters stator 10 at its end where baffle 55 is disposed. Since baffle 55 obstructs passage 53 and the passage between the magnets 13 of poles 32 and 33 are obstructed by baffles 22 and 24, the cooling fluid enters passage 54. Since passage 54 is obstructed at the opposite end of stator 10, the cooling fluid must flow over and around the rotor 11 disposed in the bore in order to exit out passage 53 at the opposite end. Thus, baffles 55 and 56 cooperate to insure a flow of cooling fluid over and around the rotor 11 in order to provide efficient dissipation of the heat developed therein. Also, inasmuch as the space between rotor 11 and arcuate surfaces 15 is very small, the velocity of the fluid flow therethrough is large, contributing to efficient heat dissipation. Baffles 55 and 56 may be constructed of any suitable material which will not interfere with the magnetic flux characteristics of the stationary member 10. In a preferred embodiment of the invention, these baffles were constructed of aluminum. The cooling fluid may be any suitable gas or liquid, but air has proved to be satisfactory for most applications.

Figure 5:
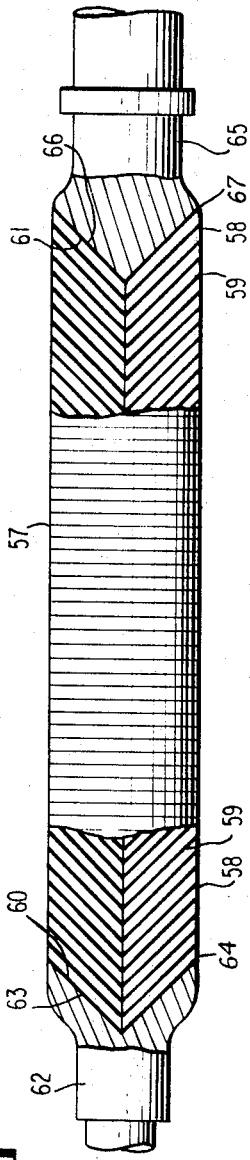
FIG. 5 is an illustration, with parts broken away, of the core of the rotor of the machine of FIG. 1.

Turning now to a detailed discussion of rotor 11, FIG. 5 is an illustration of a central magnetic core 57 thereof. Magnetic core 57 is fabricated from a number of similarly formed laminations 58 secured together into a stack primarily secured together by hardened interlaminate adhesive insulating material 59. This material, for example, may be epoxy resin adhesive series A-701 which is commercially available from Armstrong Products Company, Inc. of Warsaw, Indiana and which has been cured for 2 hours at 350° F. It should be noted at this time that no central shaft is provided through core 57; rather, the core itself functions as a shaft. To achieve a more rigid structure, laminations 58 may be made in nonplanar shape. For example, the laminations may have a generally convex surface and a generally concave surface, with the generally convex surface of one lamination being arranged adjacent to the generally concave surface of the next adjacent lamination. The complementary surfaces of structural elements, such as stub shafts, secured to the laminations would then also be provided with a generally concave or convex configuration.

Different generally convex or generally concave surface configurations may be employed and a generally conical configuration is one particular configuration that is compatible with modern manufacturing techniques. In the illustration of the invention shown in FIG. 4, the laminations 58 are shown as being cone-shaped. These cone-shaped laminations provide a large adhesive securing area between the individual laminations so that, when assembled, the core 57 is a strong unitary structure and is self-supportable during operation. The cone-shaped laminations also insure that the adhesive joints are subjected to shear stresses due to bending loads rather than tensile or pealing stresses.

Since all of the laminations 58 are cone-shaped, the assembled core 57 has a male cone-shaped surface 60 at one end thereof and a female cone-shaped surface 61 at the opposite end thereof. A stub shaft 62 having a complementary or female cone-shaped surface 63 is adhesively secured to male cone-shaped surface 60 by adhesive layer 64. Similarly, a stub shaft 65 having a complementary or male cone-shaped surface 66 is adhesively secured to female cone-shaped surface by means of adhesive layer 67. Such an arrangement provides a strong construction sandwiching the core 57 between the complementary surfaces 63 and 66 of stub shafts 62 and 65. Inasmuch as no separate shaft extends through the middle of the core, the maximum magnetic cross section is achieved for a given diameter of the rotor 11, thereby resulting in minimum inertia of the rotor 11. Extremely high torque to inertia ratios on the order of 700,000 radians/sec² have been achieved in a dynamoelectric machine having this construction.

Figure 6:
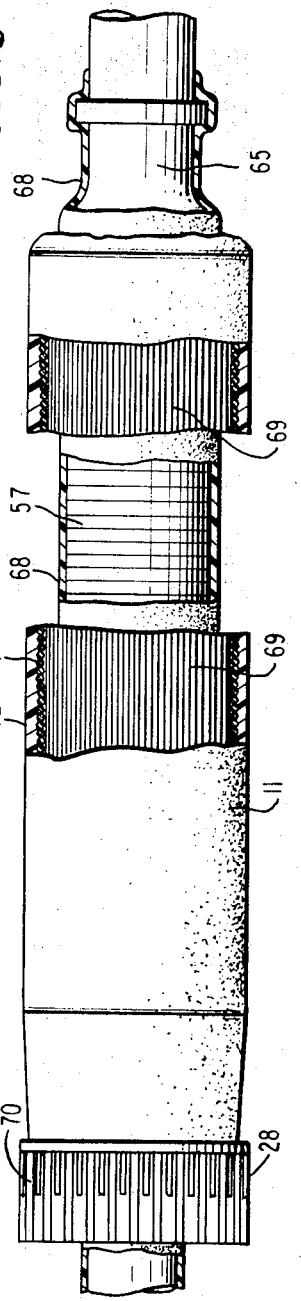
FIG. 6 is a view partly in cross section, and with parts broken away, of a complete rotor of the machine of FIG. 1.

Referring now to FIG. 6, there is shown a side elevational view partly broken away of a complete rotor 11. In FIG. 6, the outer surface of magnetic core 57 is covered with a relatively thin, hardened layer 68 of adherent insulating material. The layer 68 also extends over the outer surfaces of stub shafts 62 and 65 in the vicinity of magnetic core 57 as shown in FIG. 6. Layer 68 may comprise, for instance, synthetic polyester resins of the type disclosed in U.S. Pat. No. 2,936,296 issued to Frank M. Precopio and Daniel W. Fox on May 10, 1960, and assigned to the assignee of the present invention. Layer 68 serves to insulate magnetic core 57 and stub shafts 62 and 65. Layers on the order of 0.003 inches (3 mils) in radial thickness have been found quite adequate in actual practice for this purpose.

In the embodiment illustrated in FIG. 6, armature coils 69 are surface wound; that is, disposed on layer 68 directly over magnetic core 57 radially beyond the outer surface thereof. Each of the armature coils 69 may include, for example, two turns of electrical conductors having an adherent insulating coating, such as magnet wire. As is well known in the art, for a two-pole machine each of the armature coils 69 is wound so as to include 180 electrical degrees and are connected to segments 70 of a commutator 28. Suitable connection arrangements are well known in the art and need not be discussed here. Helical turns 71 of glass binding or yarn (which may be for example 1½mils in diameter) may be wound over the armature coils 69 and a thin coating 72 of insulating material such as Permafil varnish (which may be for example 3½mils in radial thickness) may be applied over the periphery of the armature coils 69 in the multistranded binding 71 so as to fill the voids and hold these components firmly in place. Insulating coating 72 should be compatible with insulating layer 68, so that a bond may be formed therebetween. The coating 72 provides a protective covering for armature coils 69 and also permits efficient dissipation of heat from internally of the rotor 11.

Even though in the illustrated exemplification the rotor is shown as having two stub shafts, each supported in one of the bearing assemblies 27, only the stub shaft 62 is required when the motor is of the type disclosed in U.S. Pat. No. 2,522,985, issued to H. C. Bradley on Sept. 19, 1950 and assigned to the assignee of the present invention. That patent illustrates a rotor supporting structure in which the rotor is supported for rotation solely by means of a single bearing assembly which rotatably supports the rotor shaft on only one side of the rotor core, thereby eliminating the necessity of the second stub shaft 65 and its associated bearing assembly.

Figure 7:
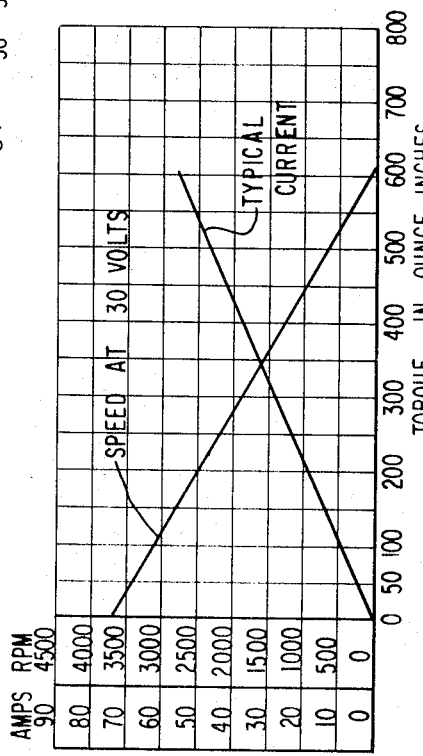
FIG. 7 is an illustration of a torque-speed and torque-current curves for a machine constructed in accordance with the principles of this invention.

Referring now to FIG. 7, there is shown typical torque-speed and torque-current curves for a dynamoelectric machine constructed in accordance with the principles of this invention except that in the machine having the curves shown in FIG. 7, no nonmagnetic inserts were used in the shell. As can be seen in FIG. 7, the curves are linear. When mounted in a typical computer application, the dynamoelectric machine constructed in accordance with the present invention performed with the following results:

| | Performance |
|---|---|
| Rated armature voltage_____volts__ | 30 |
| Rated armature current (motor totally enclosed)_____amps__ | 9 |
| Rated armature current (cooling air flow of 5 c.f.m.)_____do____ | 15.5 |
| No-load speed_____r.p.m.__ | 3,700 |
| Armature circuit resistance at 25° C___ohms__ | .53 |
| Armature circuit inductance___microhenries__ | 300 |
| Armature inertia_____oz.-in./amp__ | .0018 |
| Torque constant_____do____ | 10.8 |
| Stall torque inertia_____Rad./sec.²__ | 340,000 |
| Voltage constant_____Volt-sec./rad__ | .077 |
| Inductive time constant_____milliseconds__ | .60 |
| Inertial time constant_____do____ | 1.3 |
| Maximum safe speed_____r.p.m.__ | 8,000 |

From the above results, it can be seen that a dynamoelectric machine constructed in accordance with the principles of this invention is a high performance, rapid response type having low inertial and inductive time constants.

It should be apparent to those skilled in the art that, while what at present is considered to be the preferred embodiment of the invention has been shown and described in accordance with the patent statutes, modifications can be made without actually departing from the true spirit and scope of this invention. For example, the invention may be incorporated in dynamoelectric machines operating with more than two poles. It is intended therefore to cover in the following claims all such equivalent variations as fall within the invention.

We claim:

1. A DC dynamoelectric machine comprising a stator including a shell and at least two magnetic poles defining a bore; a rotor mounted in the bore for rotation relative to said stator; each pole comprising at least two permanent magnets defining a polar region and fixed to said shell, and a pole piece fixed to each of said permanent magnets, said magnets and pole pieces extending axially of the shell; and means for increasing the reluctance to magnetic flux tending to flow between adjacent permanent magnets in each polar region; said means for increasing including winding means comprising at least one conductor within each polar region extending axially of the shell and being disposed intermediate the adjacent permanent magnets.

2. The dynamoelectric machine of claim 1 wherein the means for increasing the reluctance to magnetic flux includes a plurality of nonmagnetic inserts for said shell, one for each pole, said nonmagnetic inserts extending axially of said shell and being transversely located in said shell at the centerline of said poles.

3. The dynamoelectric machine of claim 1 in which a conductor in one polar region is electrically connected to a conductor in another polar region whereby a short-circuited winding is formed in said stator.

4. The dynamoelectric machine of claim 1 in which said rotor comprises a magnetic core, shaft means secured to opposite ends of said core, a commutator, and a plurality of armature coils wound on said core and connected to said commutator.

5. The dynamoelectric machine of claim 4 in which said magnetic core comprises a plurality of laminations secured together by an interlaminate adhesive and said shaft means comprises a pair of stub shafts having complementary surfaces or for mating with an end of said core 6. The dynamoelectric machine of claim 5 in which said laminations and complementary surfaces are nonplanar.

7. A dynamoelectric machine comprising a stator at least two polar regions defining a bore; a rotor mounted in the bore for rotation relative to said stator, said rotor including a magnetic core comprised of a plurality of laminations having generally convex and concave opposite side surfaces with interlaminate adhesive material primarily securing said laminations together to form a rigid self-supportable structure, at least one stub shaft shaft having a surface shaped for mating with a selected surface on an associated end of said core, said stub shaft being adhesively secured to said core; whereby an enlarged magnetic cross section of the core is permitted for a given rotor diameter.

8. The dynamoelectric machine of claim 7 comprising a second stub shaft having a surface shaped for mating with another selected surface on the other end of said core, said surface of said one stub shaft and said surface of said second stub shaft being complementary, the selected surfaces of said core also being complementary, and said second stub shaft being adhesively secured to said another selected surface of the core.

9. The dynamoelectric machine of claim 7 in which said laminations have generally imperforate regions secured together.

10. A stator for a dynamoelectric machine comprising at least two magnetic poles establishing polar regions, each pole comprising at least two permanent magnets and a pole piece fixed to each of said permanent magnets, the magnets and pole pieces extending axially of said stator and said pole pieces being separated transversely by a space, and a conductor disposed in the space within each polar region, said conductor forming shielding means between two adjacent permanent magnets thereby to tend to increase the reluctance to magnetic flux tending to flow between the two adjacent permanent magnets.

11. The stator of claim 10 including a plurality of nonmagnetic inserts for said shell, one for each pole, said nonmagnetic inserts extending axially of said shell and being transversely located in said shell at the centerlines of said poles.

12. The stator of claim 10 in which each said conductor is electrically connected to each other said conductor whereby a short-circuited winding is formed.

13. A rotor for a dynamoelectric machine including a magnetic core comprised of a plurality of laminations being generally imperforate at the center portions thereof and being primarily secured together by an interlaminate adhesive material, at least one stub shaft having a surface shaped for mating with a surface on an associated end of said core, said stub shaft being adhesively secured to said core, a commutator mounted on said stub shaft, and a plurality of armature coils wound on said core and connected to said commutator.

14. The rotor of claim 13 comprising a second stub shaft having a surface shaped for mating with a surface on the other end of said core, said surface of said one stub shaft and said surface of said second stub shaft being complementary, the opposite surfaces of said core also being complementary, and said second stub shaft being adhesively secured to said core.

15. The rotor of claim 13 in which said laminations have a generally convex surface and a generally concave surface and wherein the laminations are arranged with the generally convex surface of one lamination adjacent to the generally concave surface of the next adjacent lamination.

16. A DC dynamoelectric machine comprising a stator including a shell and at least two magnetic poles defining a bore, each pole comprising at least two permanent magnets fixed to said shell and a pole piece fixed to each of said permanent magnets, said magnets and pole pieces extending axially of said shell and said pole being separated transversely by a space, a conductor disposed in the space; a rotor mounted in the bore for rotation relative to said stator; said rotor comprising a magnetic core; shaft means secured to opposite ends of said core; a commutator; and a plurality of armature coils wound on said coil connected to said commutator; said magnetic core comprising a plurality of laminations selected together by an interlaminate adhesive and said shaft means comprising stub shafts having complementary surfaces and mating with an end of said core; said laminations and complementary surfaces being cone-shaped.

17. A dynamoelectric machine comprising a stator including a shell and at least two magnetic poles defining a bore; a rotor mounted in the bore for rotation relative to said stator, said rotor including a magnetic core comprised of a plurality of laminations secured together by an interlaminate adhesive, at least one stub shaft having a surface shaped for mating with a surface on an associated end of said core, said stub shaft being adhesively secured to said core, a commutator mounted on said stub shaft, a plurality of armature coils wound on said core and connected to said commutator, and a second stub shaft having a surface shaped for mating with a surface on the other end of said core; said surface of said at least one stub shaft and said surface of said second stub shaft being complementary, the opposite surfaces of said core also being complementary, said second stub shaft being adhesively secured to said coil, and said laminations and complementary surfaces being cone-shaped.

18. A rotor for a dynamoelectric machine including a magnetic core comprised of a plurality of laminations secured together by an interlaminate adhesive, at least one stub shaft having a surface shaped for mating with a surface on an associated end of said core, said stub shaft being adhesively secured to said core, a commutator mounted on said stub shaft, and a plurality of armature coils wound on said core and connected to said commutator; said laminations, said surface shaped for mating, and said surface on an associated end of said core being cone-shaped.